United States Patent [19]
Read et al.

[11] Patent Number: 5,533,648
[45] Date of Patent: Jul. 9, 1996

[54] PORTABLE STORAGE AND DISPENSING SYSTEM

[75] Inventors: Joseph R. Read, Chesterfield; Michael S. Windham, O'Fallon, both of Mo.

[73] Assignee: Novus International, Inc., St. Louis, Mo.

[21] Appl. No.: 179,482

[22] Filed: Jan. 10, 1994

[51] Int. Cl.$^6$ ................................................ B67D 1/16
[52] U.S. Cl. ........................ 222/108; 222/146.5; 119/56.1
[58] Field of Search ........................... 222/54, 64, 146.5, 222/183, 108, 158, 154, 23, 71, 72, 14; 220/506, 901, DIG. 9; 251/129.04; 137/551, 558; 119/51.11, 51.12, 51.13, 51.14, 51.15, 52.1, 53, 56.1

[56] References Cited

U.S. PATENT DOCUMENTS

| | | |
|---|---|---|
| 810,237 | 1/1906 | Wadsworth . |
| 1,114,019 | 10/1914 | Morris . |
| 1,170,377 | 2/1916 | Weed . |
| 1,273,195 | 7/1918 | Snyder . |
| 1,625,765 | 4/1927 | Ratzenstein . |
| 1,724,582 | 8/1929 | Hart . |
| 2,102,912 | 12/1937 | Pittman ............................................ 62/1 |
| 2,460,054 | 1/1949 | Wiggins ........................................ 220/75 |
| 2,558,694 | 6/1951 | Speig ............................................. 169/4 |
| 2,623,362 | 12/1952 | Zerbe .............................................. 62/1 |
| 2,772,834 | 12/1956 | Swenson et al. ............................. 237/67 |
| 2,835,270 | 5/1958 | York et al. .................................. 137/412 |
| 2,858,136 | 10/1958 | Rind ............................................... 280/5 |
| 2,860,807 | 11/1958 | Morton ......................................... 220/15 |
| 2,864,527 | 12/1958 | Altman et al. ............................... 220/14 |
| 2,869,751 | 1/1959 | Klope et al. .................................. 220/15 |
| 2,931,211 | 4/1960 | McCullough .................................. 74/14 |
| 3,269,607 | 8/1966 | Anderson .................................... 222/173 |
| 3,448,885 | 6/1969 | Parks ............................................. 220/5 |
| 3,595,424 | 7/1971 | Jackson ........................................ 220/15 |
| 3,605,782 | 9/1971 | Hollis et al. .................................. 137/91 |
| 3,666,132 | 5/1972 | Yamamoto et al. ..................... 220/9 LG |
| 3,702,592 | 11/1972 | Gamble ........................................ 109/29 |
| 3,732,902 | 5/1973 | Muller ........................................ 141/198 |
| 3,827,455 | 8/1974 | Lee ............................................. 137/375 |
| 3,906,995 | 9/1975 | Schmidt ...................................... 137/575 |

(List continued on next page.)

FOREIGN PATENT DOCUMENTS

| | | | |
|---|---|---|---|
| 2209183 | 5/1989 | United Kingdom | ........... B65D 88/06 |
| WO90/01656 | 2/1990 | WIPO . | |

OTHER PUBLICATIONS

Publication entitled "Porta–Feed Plus Service, Advanced Chemical Management for the 1900's", Nalco Chemical Company, 1990.

*Primary Examiner*—Andres Kashnikow
*Assistant Examiner*—Lisa Douglas
*Attorney, Agent, or Firm*—Senniger, Powers, Leavitt & Roedel

[57] ABSTRACT

A system for monitoring use of a liquid, such as a liquid animal feed ingredient, including at least two storage and dispensing systems, a central station remotely located from the storage and dispensing systems and a communications link interconnecting the storage and dispensing systems and the central station. Each of the storage and dispensing systems comprises: an enclosure formed at least in part by a liquid containment structure; an opening in the enclosure providing access to the interior of the enclosure; a closure for the opening movable between open and closed positions; a tank inside the enclosure for holding a supply of liquid; an infeed line for flow of liquid into the tank; an outfeed line for discharge of liquid from the tank; a pump inside the enclosure at a side of the tank for pumping liquid from the tank via the outfeed line; a heater inside the enclosure for heating the interior of the enclosure; a level sensor within the tank for sensing the level of liquid in the tank, the level sensor generating a level signal indicative of the level of liquid; and at least one temperature sensor for sensing a temperature indicative of the temperature of the liquid in the tank. The level of liquid and the operation of the heater are monitored by the central station so that operators at the central station can respond to a low level of liquid or a malfunctioning heater in any of the storage and dispensing systems.

23 Claims, 5 Drawing Sheets

U.S. PATENT DOCUMENTS

| | | | |
|---|---|---|---|
| 3,941,272 | 3/1976 | McLaughlin | 220/9 LG |
| 3,952,907 | 4/1976 | Ogden et al. | 220/18 |
| 3,967,256 | 6/1976 | Galatis | 340/242 |
| 3,969,563 | 7/1976 | Hollis | 428/175 |
| 4,161,957 | 7/1979 | Schoellkopf | 137/205 |
| 4,281,692 | 8/1981 | Caccamisi | 141/370 |
| 4,376,489 | 3/1983 | Clemens | 220/1.5 |
| 4,464,315 | 8/1984 | O'Leary | 261/110 |
| 4,478,345 | 10/1984 | Edinger | 220/85 |
| 4,544,085 | 10/1985 | Frazer | 222/146.4 |
| 4,583,170 | 4/1986 | Carlin et al. | 364/420 |
| 4,602,344 | 7/1986 | Ferretti et al. | 364/509 |
| 4,628,329 | 12/1986 | Regnault | 346/75 |
| 4,648,043 | 3/1987 | O'Leary | 364/510 |
| 4,651,893 | 3/1987 | Mooney | 220/445 |
| 4,682,710 | 7/1987 | Turner, Jr. et al. | 222/63 |
| 4,685,327 | 8/1987 | Sharp | 73/49.2 |
| 4,697,618 | 10/1987 | Youtt et al. | 137/587 |
| 4,719,574 | 1/1988 | Duback et al. | 364/468 |
| 4,746,034 | 5/1988 | Ata et al. | 222/143 |
| 4,788,648 | 11/1988 | Ferretti et al. | 364/509 |
| 4,815,621 | 3/1989 | Bartis | 220/1 |
| 4,826,644 | 5/1989 | Lindquist et al. | 264/71 |
| 4,844,287 | 7/1989 | Long | 220/429 |
| 4,845,486 | 7/1989 | Knight et al. | 340/618 |
| 4,853,694 | 8/1989 | Tomecek | 340/621 |
| 4,890,983 | 1/1990 | Solomon et al. | 417/41 |
| 4,895,272 | 1/1990 | Beneditis et al. | 220/85 |
| 4,911,320 | 3/1990 | Howes | 220/20 |
| 4,911,326 | 3/1990 | McGouran, Jr. | 220/445 |
| 4,934,553 | 6/1990 | McCarthy | 220/454 |
| 4,948,010 | 8/1990 | Wiggins | 220/85 |
| 4,948,340 | 8/1990 | Solomon et al. | 417/41 |
| 4,960,222 | 10/1990 | Fields, III | 220/5 A |
| 4,989,750 | 2/1991 | McGarvey | 220/444 |
| 5,004,632 | 4/1991 | McGarvey et al. | 427/410 |
| 5,005,615 | 4/1991 | McGarvey et al. | 141/198 |
| 5,012,949 | 5/1991 | McGarvey et al. | 220/455 |
| 5,016,666 | 5/1991 | McKinney et al. | 137/1 |
| 5,016,689 | 5/1991 | McGarvey et al. | 141/198 |
| 5,038,456 | 8/1991 | McGarvey et al. | 29/460 |
| 5,056,017 | 10/1991 | McGarvey | 364/403 |
| 5,060,823 | 10/1991 | Perlman | 222/1 |
| 5,071,166 | 12/1991 | Marino | 280/830 |
| 5,082,034 | 1/1992 | Soper | 141/88 |
| 5,088,530 | 2/1992 | Harp | 141/86 |
| 5,092,024 | 3/1992 | McGarvey | 29/460 |
| 5,103,996 | 4/1992 | McGarvey | 220/455 |
| 5,114,046 | 5/1992 | Bryant | 222/108 |
| 5,126,729 | 6/1992 | McKinney et al. | 340/825.06 |
| 5,137,064 | 8/1992 | McGarvey et al. | 141/198 |
| 5,197,627 | 3/1993 | Disabato et al. | 220/571 |
| 5,265,656 | 11/1993 | McGarvey | 141/198 |
| 5,284,191 | 2/1994 | McGarvey | 141/198 |
| 5,285,920 | 2/1994 | McGarvey | 220/444 |
| 5,319,545 | 6/1994 | McGarvey et al. | 364/403 |
| 5,333,752 | 8/1994 | Harding | 200/565 |
| 5,361,940 | 11/1994 | Miller | 222/77 |
| 5,365,980 | 11/1994 | deBerardinis | 141/1 |
| 5,406,993 | 4/1995 | McGarvey | 141/198 |

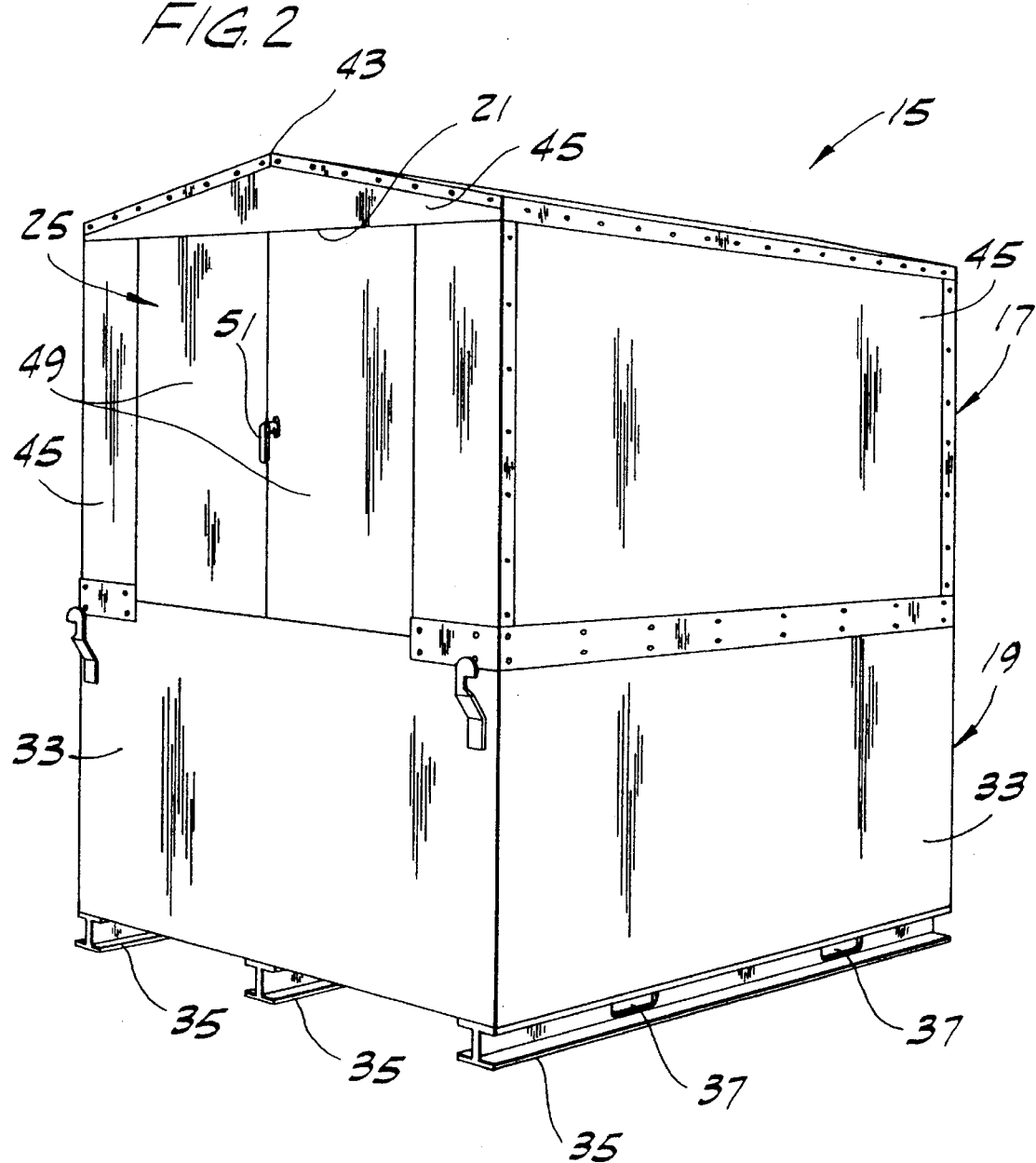

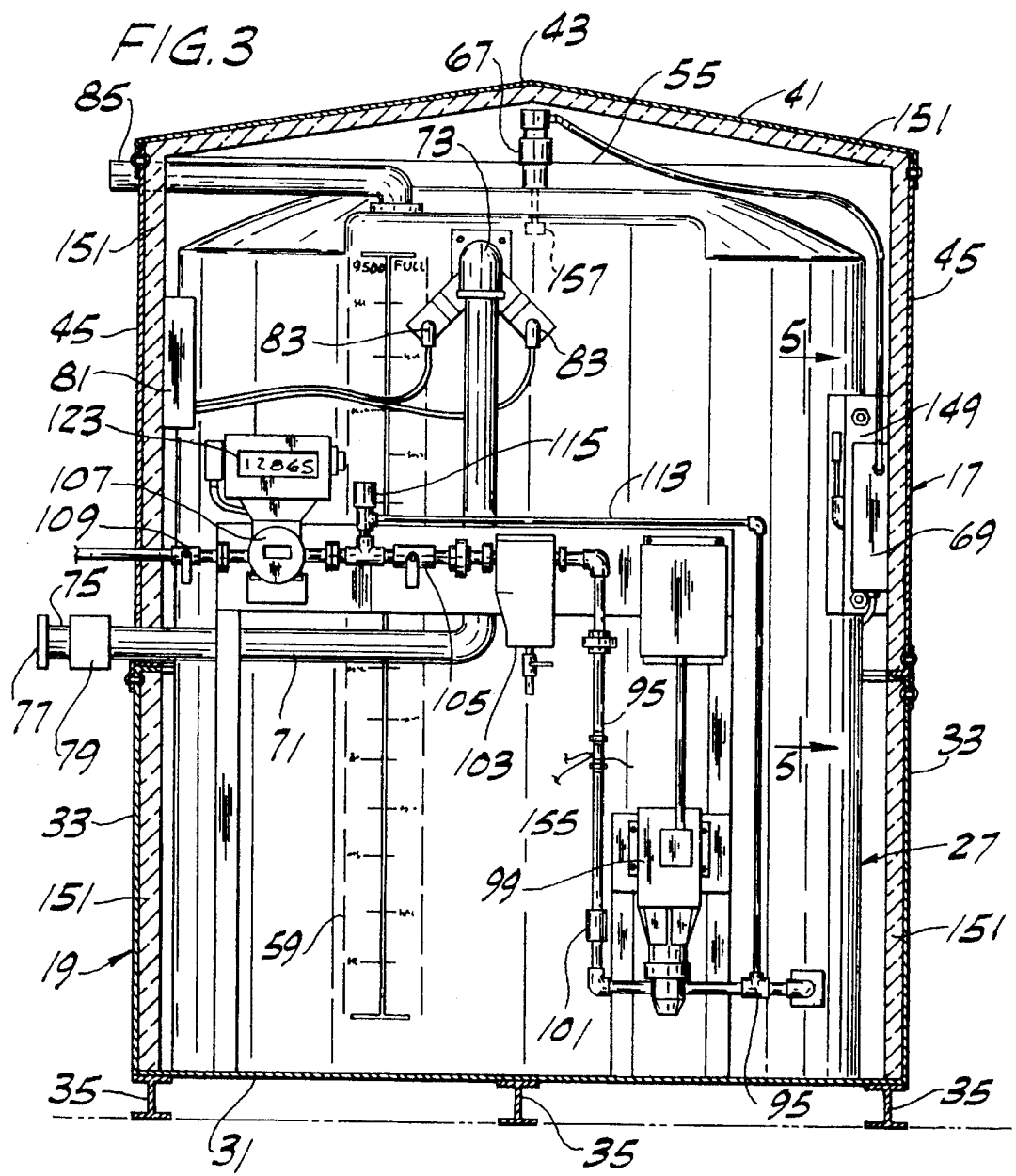
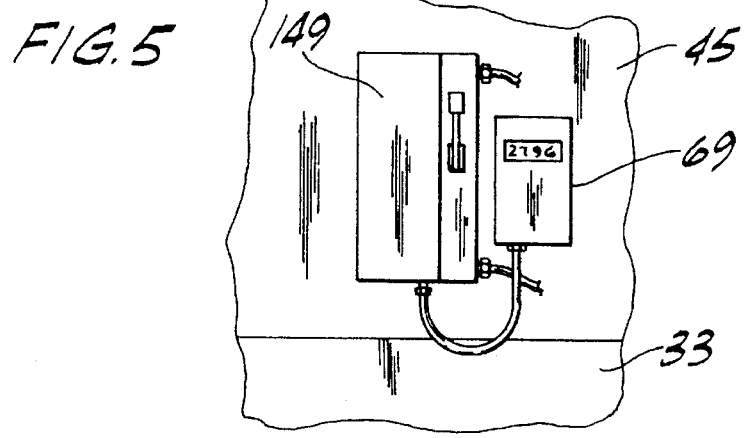

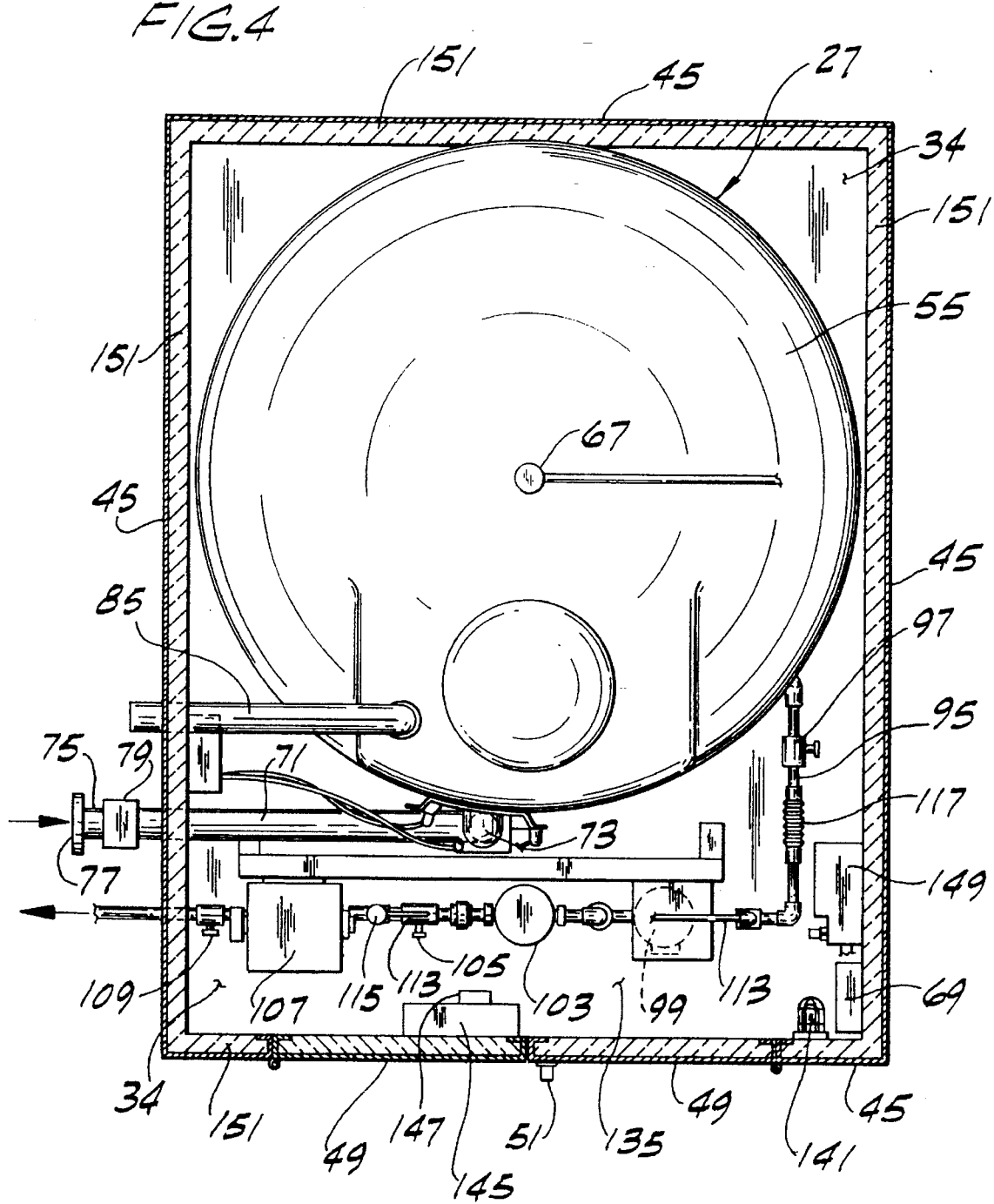

PORTABLE STORAGE AND DISPENSING SYSTEM

BACKGROUND OF THE INVENTION

This invention relates generally to a storage and dispensing system and, more particularly, to a portable, self-contained system which stores and dispenses liquid product, such as liquid animal feed ingredients.

This invention has particular (albeit not exclusive) application to the liquid animal feed industry. For users of relatively small quantities of liquid animal ingredients, the conventional practice has been to supply product in drums (e.g., 55 gal. drums) or somewhat larger metal containers delivered to the customer's site. After these containers have been emptied, they are retrieved by the supplier or disposed of by the customer and replaced by full containers. This process is costly and inefficient. Moreover, container disposal raises environmental concerns. Further, such containers are not equipped with a secondary containment structure to contain any liquid which may spill or leak from the container. For these reasons, some users of small quantities of animal feed ingredients prefer using dry feed ingredients over liquid ingredients.

For users requiring larger volumes of liquid animal feed ingredients, the supplier often constructs a permanent storage and dispensing facility at the customer's site. However, this process is very expensive, and after the facility is built it cannot easily be moved or removed.

Also, in prior systems, the amount of liquid feed in inventory at any given time and its temperature are difficult to accurately monitor. This can result in excessive inventory on hand, or shortages of product at critical times.

SUMMARY OF THE INVENTION

Among the several objects of this invention may be noted the provision of a portable, self-contained system for storing and dispensing a liquid chemical, such as a liquid animal feed ingredient; the provision of such a system which is portable so that it can be manufactured in modular fashion at a factory location and then conveniently and economically transported to the customer's site for installation; the provision of such a system which is pre-wired and pre-piped for easy hook-up and installation in the field; the provision of such a system which can readily be removed from the customer's site; the provision of such a system where the current level of inventory available in the system can be monitored from a remote location, such as at a central supply station, so that the amount of inventory may be accurately controlled and closely managed; the provision of such a system in which an alarm is signalled at the remote location if the liquid chemical in inventory falls below a predetermined level; the provision of such a system which allows for convenient filling of the system to replenish depleted inventory by efficiently combining replenishment shipments for more than one system on a single delivery truck; the provision of such a system in which the system equipment and controls are protected against the weather; the provision of such a system which includes a primary vessel or tank for holding a supply of liquid, and a secondary containment structure for containing any spills or leaks from the primary vessel or associated equipment; the provision of such a system which includes a heated enclosure for maintaining the liquid chemical, system controls and system equipment above a desired temperature for preventing freezing and ensuring proper system operation; the provision of such a system in which the aforesaid enclosure is of a size sufficient to permit a person to service and maintain the equipment and controls of the system while working inside the enclosure; the provision of such a system in which the aforesaid enclosure can be locked to secure the system against unauthorized intrusion; the provision of such a system in which the temperature of the liquid chemical can be monitored from a remote location; the provision of such a system in which an alarm is signalled if the temperature of the liquid chemical falls below a predetermined temperature; the provision of such a system which delivers accurate quantities of liquid chemical on demand from an automatic control system; the provision of such a system in which the current inventory of liquid chemical can readily be determined by visual observation; the provision of such a system which enables a person quickly and easily to determine both the amount of liquid chemical required to fill the system and the amount of liquid chemical remaining in the system; the provision of such a system in which the instrumentation and controls are illuminated to facilitate reading inventory levels and to facilitate maintaining and servicing the system equipment and controls; and the provision of such a system which is economical to construct and easy to operate.

Generally, a portable storage and dispensing system of the present invention comprises an enclosure having a lower part forming a liquid containment structure with a floor and a side wall formation extending up from the floor, and an upper part over the liquid containment structure attached to the side wall of the liquid containment structure. An opening in the upper part of the enclosure provides access to the interior of the enclosure. A closure for the opening is movable between open and closed positions. A tank inside the enclosure holds a supply of liquid chemical. The tank has a height substantially greater than the height of the side wall formation of the liquid containment structure. An infeed line is provided for flow of liquid into the tank, and an outfeed line is provided for discharge of liquid from the tank. A pump and associated equipment is mounted inside the enclosure at a side of the tank for pumping liquid from the tank via the 35 outfeed line, the enclosure being of sufficient size to permit a person to service the pump or associated equipment while inside the enclosure at a location adjacent the pump.

A system of this invention for monitoring use of a liquid chemical, such as a liquid animal feed ingredient, comprises at least two storage and dispensing systems, a central station remotely located from the storage and dispensing systems, and a communications link interconnecting the storage and dispensing systems and the central station. Each of the storage and dispensing systems comprises an enclosure formed at least in part by a liquid containment structure, an opening in the enclosure providing access to the interior of the enclosure, and a closure for the opening movable between open and closed positions. A tank inside the enclosure holds a supply of liquid. An infeed line is provided for flow of liquid into the tank, and an outfeed line is provided for discharge of liquid from the tank. A pump is mounted inside the enclosure at a side of the tank for pumping liquid from the tank via the outfeed line. A heater inside the enclosure heats the interior of the enclosure. A level sensor is provided inside the tank for sensing the level of liquid in the tank. The level sensor generates a level signal indicative of the level of liquid. At least one temperature sensor is provided for sensing a temperature indicative of the temperature of the liquid in the tank. The temperature sensor generates a temperature signal indicative of the temperature of the liquid in the tank. The aforesaid communications link comprises a transmitter at each of the storage and dispensing systems for generating communications signals representative of the level signal and the temperature signal. The central station comprises a receiver for receiving the communications signals and for monitoring the level and the temperature as sensed by the temperature sensor whereby the level of liquid and the operation of the heater are monitored by the central station so that operators at the central station can respond to a low level of liquid or a malfunctioning heater in any of the storage and dispensing systems.

Other objects and features will be in part apparent in part pointed out hereinafter.

BRIEF DESCRIPTION OF THE DRAWINGS

FIG. 2 is a perspective of an enclosure of the system;

FIG. 3 is an elevational view showing a tank and other equipment inside the enclosure;

FIG. 4 is a top plan of the equipment inside the enclosure of FIG. 2; and

FIG. 5 is an elevational view of equipment mounted on a side wall of the enclosure.

Corresponding parts are designated by corresponding reference numerals throughout the several views of the drawings.

DETAILED DESCRIPTION OF THE PREFERRED EMBODIMENT

Figure 1:
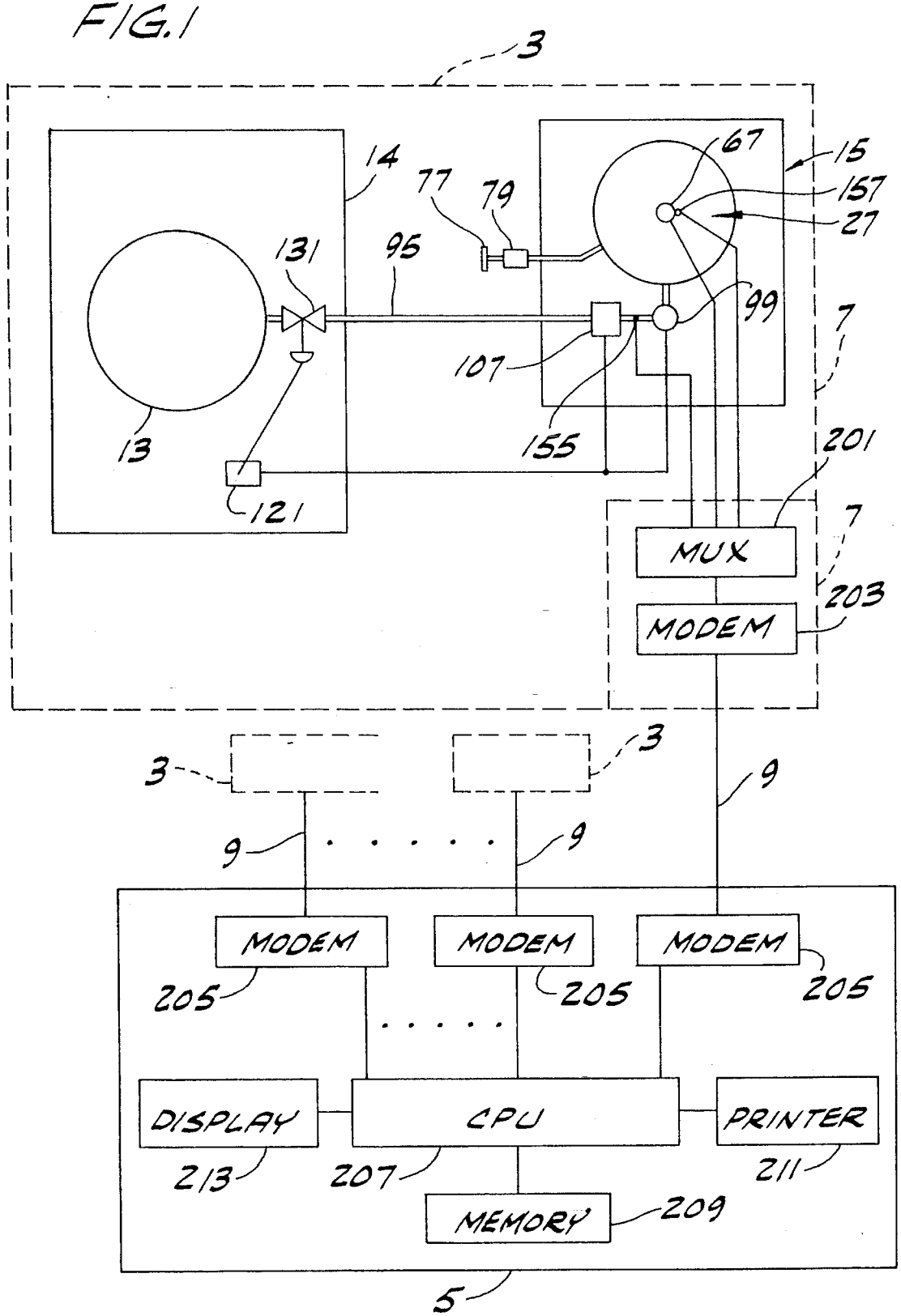
FIG. 1 is a diagrammatic view of the system of the present invention.

Referring now to the drawings, and first to FIG. 1, a system of this invention for monitoring use of a liquid chemical, such as a liquid animal feed ingredient, is generally indicated by the reference numeral 1. As shown, the system comprises at least two storage and dispensing systems, each generally designated 3, a central station 5 remotely located from the storage and dispensing systems, and a communications link 7 to be described later in this specification connecting each storage and dispensing system 3 via a telephone line 9 to the central station 5 for enabling the operation of the storage and dispensing systems 3 to be monitored at the central station 5. Each storage and dispensing system is adapted to deliver quantities of liquid chemical (e.g., methionine hydroxy analogue) to a mixer, typically located in a building on the customer's premises, for preparation of a batch of animal feed.

Each storage and dispensing system 3 comprises a portable enclosure, generally designated 15 (see FIG. 2), having upper and lower parts designated 17 and 19, respectively, an opening 21 in the upper part of the enclosure providing access to the interior of the enclosure, and a closure 25 for the opening movable between open and closed positions. A tank, generally indicated at 27, is situated inside the enclosure for holding a supply of liquid chemical.

The lower part 19 of the enclosure 15 forms a liquid containment structure. The containment structure is generally rectangular in shape, having a floor 31 and side wall formation comprising four side walls 33 extending up from the floor to a suitable height. The floor and walls are preferably formed by a number of large-gage metal panels (e.g., ¼ in. carbon steel panels) welded together to form a one-piece leakproof structure. The side walls 33 of the structure surround the tank and are spaced from the tank 27 to create an annular space 34 (FIG. 4) around the tank between the tank and the side walls 33. This space 34 should be sized to contain a volume of liquid preferably not substantially less than, and more preferably at least as great as, the capacity of the portion of the tank 27 above the side wall formation of the containment structure so that in the event of tank failure, the liquid contents of the tank cannot escape the containment structure. A plurality of parallel I-beam rails 35 (three such rails are shown) extend along the underside of the floor of the containment structure for reinforcing the structure and for supporting the structure on a suitable surface. As illustrated in FIG. 2, the rails 35 have pairs of aligned openings 37 therein for receiving the tines of a forklift truck (the tines extend generally at right angles to the rails) so that the entire enclosure may be readily lifted and transported from one location to another.

The upper part 17 of the enclosure 15 comprises a number of smaller-gage metal panels (e.g., 22-gage stainless steel sheets) joined by suitable fasteners (e.g., rivets or screws) to form a structure having a peaked roof 41 sloping down from a ridge 43, and side walls 45 extending down from the roof to the lower part of the enclosure. The lower ends of these side walls are preferably removably attached to the upper ends of the side walls 33 of the containment structure 19 by suitable fasteners. The closure 25 comprises a pair of doors, each designated 49, hinged along their vertical side edges for swinging open and closed. A suitable latch 51 is provided for locking the doors closed to secure the enclosure against unauthorized entry.

It is contemplated that the enclosure 15 may also be fabricated from suitable plastic, such as a high-density cross-linked polyethylene available from Poly Processing Company of Monroe, La. For example, the upper and lower parts 17, 19 of the enclosure could be molded as separate pieces with mating flanges fastened together by nuts and bolts.

The portability of the enclosure 15 is advantageous because this enables the structure to be fabricated at the factory in mass quantities, and then readily transported to selected sites for use. The portable nature of the enclosure also permits it readily to be relocated at the user's site or removed from the user's site.

Figure 3A:
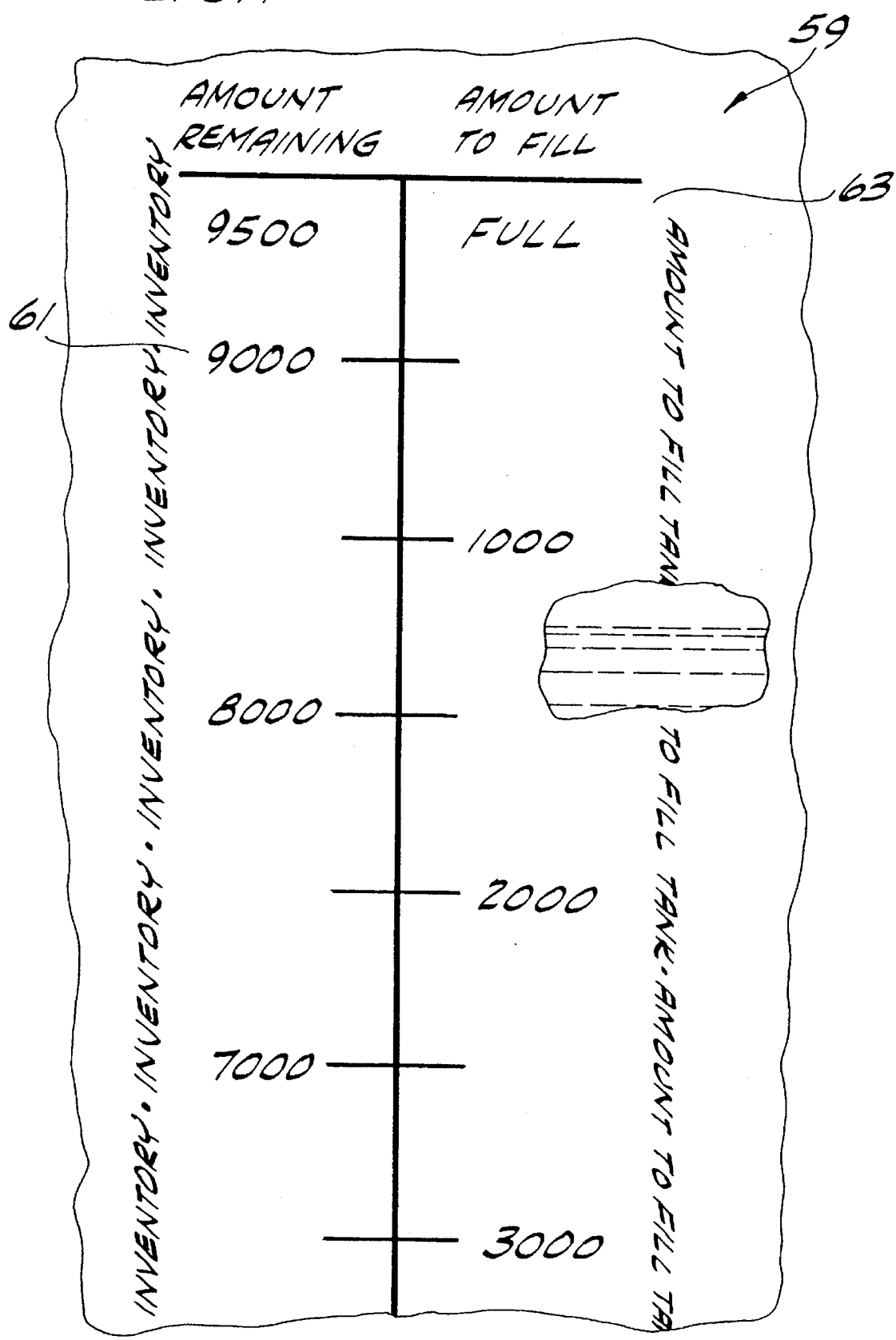
FIG. 3A is a partial elevational view of a scale on the tank.

The tank 27 inside the enclosure 15 is generally cylindric in shape and extends up from the floor to a height substantially above the containment structure, the domed top 55 of the tank being spaced somewhat below the peaked roof 41 of the enclosure. The tank is of a suitable material, preferably a translucent plastic (e.g., high-density, cross-linked polyethylene) enabling the level of liquid in the tank to be seen from outside the tank. The capacity of the tank will vary according to need (1000 gallons is common). To accurately gauge the amount of liquid in the tank, a vertical scale 59 is provided on the outside of the tank, comprising a first part 61 for indicating the amount of liquid remaining in the tank and a second part 63 for indicating the amount of liquid required to fill the tank. In the preferred embodiment, this scale is in the form of a transparent vertical strip of material attached to the tank (as by adhesive) and having graduated marks thereon at vertically spaced intervals. As shown in Fig. 3A, the first part 61 of the scale 59 has a series of graduated marks which decrease in magnitude from top to bottom to indicate how much liquid remains in the tank, and the second part 63 of the scale has a series of graduated marks which increase in magnitude from top to bottom to indicate how much liquid is needed to fill the tank.

A measuring device 67 projects up from the top 55 of the tank for measuring the level of liquid in the tank. This device 67 is preferably a level sensor, such as an ultrasonic sensor of the type sold under the trademark "Level Devil" by Electronic Sensors, Inc. of Wichita, Kans., and is operable for sending a signal indicative of the level of liquid in the tank to the central station 5 so that the current amount of liquid in the tank can be closely monitored. The device 67 includes a digital readout 69 (FIG. 5) mounted at a convenient height on a side wall 45 of the upper part 17 of the enclosure 15 so that it is readily visible by a person looking through the open closure 25.

An infeed line for flow of liquid into the tank 27 is indicated at 71. This line 71 extends from outside the tank generally horizontally through a side wall 45 of the upper part 17 of the enclosure (above the containment structure 19) and is connected at its outlet end 73 to the side wall of the tank 27 adjacent its top 55. The inlet end 75 of the infeed line 71 is provided with a suitable quick-connect coupling 77 for releasably connecting the line to a supply source, such as a tank truck carrying liquid to be transferred to the tank. A shut-off valve 79 (e.g., a ball valve) in the infeed line 71 on the outside of the enclosure is opened to permit filling of the tank and is closed at other times. Optionally, valve 79 may be motorized and powered by an actuator control box 81 having buttons or other controls, not shown, which permit manually opening and closing of the valve. In addition, and optionally, two capacitive proximity switches 83 may be provided to sense liquid in the tank. When the liquid level reaches the height of the switches 83, control box 81 receives a signal which automatically causes it to close the valve 79 and prevent overfilling of the tank.

A vent 85 extends from the top 55 of the tank 27 through a side wall 45 of the enclosure and serves to vent the interior of the tank to atmosphere (this is necessary during filling of the tank).

Indicated at 95 in FIGS. 3 and 4 is an outfeed line connected to the tank 27 adjacent its bottom for discharge of liquid from the tank for delivery to the mixer 13. Several pieces of equipment may be installed in the outfeed line 95 inside the enclosure to deliver metered amounts of liquid from the tank, including a first shut-off valve 97 (e.g., a ball valve) immediately adjacent the tank, a pump 99 at one side of the tank, a check valve 101 downstream from the pump to prevent backflow through the pump, a strainer 103 downstream from the check valve 101, a second shut-off valve 105 downstream from the strainer, a metering device 107 downstream from the second shut-off valve 105 for measuring the amount of liquid feed dispensed from the tank, and a third shut-off valve 109 downstream from the metering device 107 adjacent the side wall 45 through which the outfeed line 95 exits the enclosure. A bypass line 113 (FIG. 3) is connected at its inlet end to the outfeed line 95 immediately upstream from the pump 99 and at its outlet end immediately downstream from the second shut-off valve 105. The bypass line 113 incorporates a normally closed relief valve 115. In the event there is a pressure build-up in the main line 95 (due to a blockage in the line, for example), the relief valve 115 is operable to open to allow flow through the bypass line 113 back to the suction side of the pump 99 so that the pump can continue to operate without risk of damage to the system. A flexible connection 117 (e.g., flexible hose) is interposed in the outfeed line 95 between the pump 99 and the tank 27 to isolate the tank from any pump vibrations.

The pump 99 may be a positive displacement pump sold under the trade designation Model G724 by Viking Pump, Inc., Cedar Falls, Iowa. Energization of the pump is controlled by a remote controller 121 operated by the customer.

The metering device 107, which is an optional piece of equipment, is preferably a gear meter capable of very accurate measurement, such as a gear meter with a digital readout 123 of the type sold under the trade designation "Brooks" Model 9402 by the Brooks Instrument Division, Emerson Electric Company, Satesboro, Ga. The readout preferably faces the opening 21 in the enclosure 15 so that it can be read conveniently by a person looking through the opening when the doors 49 are open. The metering device 107 is operable to measure the quantity of product flowing through it and, when the desired amount of product has been supplied, to signal the automatic controller to deenergize the pump 99.

A pneumatically or electrically operated shut-off valve 131 under the control of the controller is provided in the outfeed line 95 adjacent the mixer 13, as shown in FIG. 1. The controller is operable, upon energization of the pump 99, to open this valve 131 to permit flow to the mixer.

In accordance with this invention, the infeed line 71, the outfeed line 95, and the various valves and equipment in these two lines are disposed in the relatively wide space 135 (FIG. 4) which exists between the tank 27 and the side 33, 45 of the enclosure 15 with the access opening 21 in it. As a result, these lines and associated parts are readily visible and accessible by a person via the opening 21 when the doors 49 are open. Furthermore, as illustrated in FIG. 4, the enclosure is of sufficient size to permit a person to access the space 135 inside the enclosure adjacent the pump 99 so that the pump and associated equipment may be conveniently serviced and maintained. Access to this space 135 is through the access opening 21. The space 135 may be sufficiently large to permit a person to stand inside the enclosure or only large enough for a person to lean over the side wall 33 through the opening 21 to service the equipment. Exemplary dimensions for an enclosure suitable to house a 1000 gallon tank are six feet wide, by eight feet long, by seven and one-half feet high (this does not include the height of the supporting I-beams, which may be 4-in. high I-beams).

The enclosure 15 is suitably wired for electricity for operating the liquid level measuring device 67, pump 99, metering device 107, and an electric light 141 which serves to illuminate the inside of the enclosure to facilitate maintenance and servicing of the equipment, and reading of the instrumentation and tank scale 59. An electric heater 145 with an adjustable thermostat control 147 is also provided inside the enclosure 15 for maintaining the air temperature inside the enclosure at or above a selected temperature (e.g., approximately 40 degrees F.) needed to efficiently pump liquid from the tank 27. The heater 145 may be mounted at any suitable location, such as on a side wall 33 of the lower part 19 of the enclosure relatively close to the pump 99 and associated equipment. If the enclosure is to be placed in an environment subject to severe cold (e.g., below 20 degrees F.) for an extended period of time, the inside of the enclosure may be lined with thermal insulation 151 to increase the efficiency of the heater. A supplemental heater (not shown) may also be provided. An electric service box mounted on a side wall 45 of the upper part 17 of the enclosure is indicated at 149.

A first temperature sensor 155 (e.g., a thermocouple) is mounted (e.g., strapped) to the outfeed line 95 adjacent the pump 99 for sensing the temperature of the pipe and, to some extent, the surrounding air, which should be indicative of the temperature of the liquid chemical inside the tank 27. The sensor 155 is operable through the communication link 7 to signal the central station 5 so that the temperature inside the enclosure 15 can be monitored. Preferably, an alarm is indicated by the central station 5 if the temperature as sensed by the sensor 155 drops below a predetermined temperature. A second temperature sensor 157 (which may be associated with the level measuring device 67, as shown in FIG. 3) is also provided inside the tank 27 for measuring the temperature of the air in the head space of the tank. This sensor 157 is also operable to signal the central station 5. It will be understood that the specific location and number of temperature sensors is not important so long as the temperature which is sensed is indicative of the temperature of the liquid in the tank so that this temperature can be closely monitored. At least two temperature sensors are desirable for reliability, but one may suffice. If only one it used, it is preferred that it be located inside the tank 27 for maximum accuracy.

A second thermostat (not shown) is provided inside the enclosure 15 for controlling a heating element (not shown) positioned on the run of outfeed line 95 between the enclosure 15 and the building 14 housing the mixer 13. The sensing bulb of this thermostat is located outside the enclosure for sensing the outside ambient air temperature. The thermostat is operable to energize the heating element when the temperature drops below a predetermined temperature, and to deenergize the heating element when the temperature rises above the stated predetermined temperature. The heating element may be electric heat tape, for example, wrapped around the line and covered by insulation.

The communication link 7 may be any type of telemetry system known in the art which is capable of interconnecting the storage and dispensing system 3 with the central station 5. For example, the link 7 may be a wireless communication link transmitting radio frequencies, an optical link transmitting over fiber optic cable or a hard wire link such as the preferred embodiment illustrated in FIG. 1. Output from the first temperature sensor 155 and the second temperature sensor 157 may be multiplexed with the output from the level measuring device 67 by a multiplexer 201. The multiplexed output signal from the multiplexer is provided to a modem 203 which communicates with a modem 205 at the central station 5. A line interconnecting modems 203 and 205 may be a dedicated telephone line. Alternatively, modem 203 may be an auto-dial system which automatically interconnects with modem 205 at preprogrammed times via a telephone line to download the multiplexed signals. Although the multiplexer 201 is illustrated as a separate element, it is contemplated that it may be part of the measuring device 67, in which case the sensors 155 and 157 would be connected to the measuring device 67 which in turn would be connected to the modem 203.

Although the central station is shown as having a plurality of modems 205, one for each storage and dispensing system 3, it is contemplated that the various inputs from each of the storage and dispensing systems may be multiplexed into a single input provided to a single modem for the central station 5. In either case, the inputs from the various storage and dispensing systems 3 are provided to a central processing unit (CPU) 207 which converts the inputs into information representing temperature and/or tank level which is stored in a memory 209. Preferably, CPU 207 may be a personal computer having communications software. After receiving a call from modem 203, the CPU 207 prompts the modem 203 in order to determine the identification of the particular system 3 calling in and in order to poll the temperature sensors 155 and 157 and the level measuring device 67. Also stored in memory 209 is preset information defining an acceptable range for the temperature to be measured by each of the sensors of each of the storage and dispensing systems 3. In addition, an acceptable range for the level of each of the tanks as measured by the level measuring devices of each of the systems 3 is also stored in memory 209. The central processing unit 207 compares each preset range to the converted information representing the actual temperatures being monitored or representing the actual level in the various tanks. When any of the converted information is outside the preset range, the central processing unit 207 periodically prints reports on a printer 211 indicating to an operator at the central station 5 the status of each system 3 and specifically indicating any alarm conditions which may require service. Alternatively, a display 213 may be connected to the central processing unit 207 to display the reports or other information stored in memory. For example, a temperature signal indicating a temperature below the acceptable range may be the result of a malfunctioning heater 145 which is not operating or which is providing insufficient heat. Alternatively, a temperature signal indicating a temperature above the acceptable range may be the result of a malfunctioning heater which is constantly operating or providing excessive heat. In each of these examples, the central processing unit 207 would provide a report so that the malfunctioning heater would be detected by an operator at the central station. As another example, a level signal indicating a tank level below the acceptable range would indicate to the operator at the central station that the tank should be refilled or that there is a leak in the tank. Alternatively, a level signal indicating a tank level above the acceptable range would indicate to the operator at the central station that there is a malfunction indicating that servicing of the storage and dispensing system may be necessary.

In the preferred embodiment illustrated in FIG. 1, modem 203 constitutes a transmitter at each of the storage and dispensing systems for generating communication signals representative of the temperature signal monitored by the temperature sensors 155, 157 and the level signal monitored by the level measuring device 67. Modem 205 constitutes a receiver of the central station 5 for receiving the communication signals provided by modem 203. The central station 5 includes a central processing unit 207 which monitors the level sensed by device 67 and temperature as sensed by the temperature sensors 155, 157 whereby the level of liquid and the operation of the heater 145 are monitored by the central station so that operators at the central station can respond to a low level of liquid or a malfunctioning heater in any of the storage and dispensing systems 3.

Installation and use of a system of this invention is described below.

Because the enclosure 15 is readily portable, it can be fabricated with most of the controls, equipment, plumbing and wiring pre-installed at a factory location for shipment as a self-contained unit. This results in a significant reduction in fabrication and installation costs. Upon arrival at the customer's site, the enclosure is placed at a suitable location on level ground, and final field connections are made. These may include connection of the vent 85 to the tank 27; connection of the infeed line 71 to the tank; connection of the outfeed line 95 to the mixer 13; and installation of the control valve 131 in the outfeed line. External electric connections are also made. It will be apparent, therefore, that the entire system may be up and running in short order.

The system can be managed at the central station 5 by monitoring the level of the liquid in the tank 2 as signalled by the measuring device 67. If the liquid level drops below a certain level, steps can be taken to refill the tank. The temperature of the liquid in the tank can also be monitored to ensure that the temperature of the liquid remains above a selected temperature. In the event one or more of the sensors 155, 157 in the enclosure indicates that such temperature has dropped below a predetermined temperature, indicating a problem with the heater 145, for example, a service person can be dispatched to remedy any problem which may exist.

Operation of the system to dispense metered amounts of liquid chemical to the mixer 13 is also easily accomplished by using the controller 121. The counter on the controller is set to correspond to a desired amount of liquid to be dispensed. The controller is then operated to energize the pump 99 and to open the control valve 131 for delivery of product to the mixer. As product flows through the meter 107, signals are sent to the controller 121 to decrement the counter according to the amount of product flowing through the meter. When the counter has decremented to zero, the controller automatically generates signals to deenergize the pump 99 and to close the control valve 131.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A storage and dispensing system for a liquid chemical, comprising a portable enclosure having a leakproof lower part forming a liquid chemical containment structure with a floor and a side wall formation extending up from the floor, and an upper part over the liquid chemical containment structure attached to the side wall formation of the liquid chemical containment structure, an opening in the upper part of the enclosure providing access to the interior of the enclosure, a closure for the opening movable between open and closed positions, a tank inside the enclosure for holding a supply of liquid chemical, said tank having a height substantially greater than the height of the side wall formation of said liquid chemical containment structure, an infeed line for flow of liquid chemical into the tank, an outfeed line for discharge of liquid chemical from the tank, and a liquid chemical transfer device and associated equipment inside the enclosure situated at a side of the tank on the inside of said liquid chemical containment structure for transferring liquid chemical from the tank via said outfeed line, said enclosure being of sufficient size to permit a person to service the liquid chemical transfer device and said associated equipment while inside the enclosure at a location adjacent the liquid chemical transfer device.

2. A system as set forth in claim 1 wherein said side wall formation surrounds the tank and is spaced therefrom to create a liquid chemical containment space between the tank and the side wall formation, said containment space being sized to contain a volume of liquid chemical not substantially less than the capacity of the portion of the tank above the side wall formation of the containment structure.

3. A system as set forth in claim 1 further comprising a heater inside the enclosure for heating the interior of the enclosure.

4. A system as set forth in claim 3 further comprising a thermostat control for controlling operation of the heater.

5. A system as set forth in claim 3 further comprising thermal insulation on interior surfaces of the upper part of the enclosure and on interior surfaces of said side wall formation of the lower part of the enclosure.

6. A system as set forth in claim 1 wherein the upper part of the enclosure comprises a roof and side walls extending down from the roof having lower ends attached to said side wall formation of said liquid chemical containment structure, said opening being in a side wall of the upper part of the enclosure, the height of the side walls of the upper part being greater than the height of said side wall formation of the lower part.

7. A system as set forth in claim 1 wherein the tank has a top spaced below the roof of the enclosure, and wherein said system further comprises a measuring device projecting up from the top of the tank for measuring the level of liquid chemical in the tank.

8. A system as set forth in claim 7 further comprising an electronic digital readout associated with said measuring device inside the enclosure, and an electric light inside the enclosure for illuminating the interior of the enclosure to facilitate reading said digital readout, and further to facilitate servicing the liquid chemical transfer device and said associated equipment.

9. A system as set forth in claim 1 further comprising a metering device associated with the outfeed line for measuring the amount of liquid chemical transferred from the tank.

10. A system as set forth in claim 9 wherein said metering device is a gear meter.

11. A system as set forth in claim 1 further comprising a vertical scale on the tank, said scale comprising a first part for indicating the amount of liquid chemical remaining in the tank, and a second part for indicating the amount of liquid chemical required to fill the tank.

12. A system as set forth in claim 11 wherein said tank is of translucent material enabling the level of liquid chemical in the tank to be seen from outside the tank, and wherein said scale comprises a transparent vertical strip of material attached to the tank and having graduated marks thereon at vertically spaced intervals, said first scale part having a series of graduated marks which decrease in magnitude from top to bottom, and said second scale part having a series of graduated marks which increase in magnitude from top to bottom.

13. A system as set forth in claim 1 further comprising a temperature sensor for sensing a temperature indicative of the temperature of the liquid chemical in the outfeed line.

14. A system as set forth in claim 13 further comprising means for signalling an alarm at a location remote from said enclosure in the event the temperature sensed by said temperature sensor drops below a first predetermined temperature.

15. A system as set forth in claim 1 further comprising a temperature sensor located inside the tank.

16. A system as set forth in claim 15 further comprising means for signalling an alarm at a location remote from said enclosure in the event the temperature inside the tank, as sensed by said temperature sensor, drops below a second predetermined temperature.

17. A system as set forth in claim 1 further comprising a shut-off valve in the infeed line located outside the enclosure.

18. A system for monitoring use of a liquid chemical, comprising:

at least two storage and dispensing systems;

a central station remotely located from the storage and dispensing systems; and a communications link interconnecting the storage and dispensing systems and the central station;

wherein each of the storage and dispensing systems comprises:

an enclosure formed at least in part by a leakproof liquid chemical containment structure;

an opening in the enclosure providing access to the interior of the enclosure;

a closure for the opening movable between open and closed positions;

a tank inside the enclosure for holding a supply of the liquid chemical;

an infeed line for flow of the liquid chemical into the tank;

an outfeed line for discharge of the liquid chemical from the tank;

a pump and associated equipment inside the enclosure situated at a side of the tank on the inside of the liquid chemical containment structure for pumping the liquid chemical from the tank via said outfeed line; and a heater inside the enclosure for heating the interior of the enclosure;

a level sensor within the tank for sensing the level of the liquid chemical in the tank, said level sensor generating a level signal indicative of said level of the liquid chemical;

at least one temperature sensor for sensing a temperature indicative of the temperature of the liquid chemical in the tank, said temperature sensor generating a temperature signal indicative of the temperature of the liquid chemical and indicative of operation of said heater;

wherein said communications link comprises a transmitter at each of the storage and dispensing systems for generating communications signals representative of the level signal and the temperature signal; and wherein the central station comprises a receiver for receiving the communications signals, said station monitoring the level of the liquid chemical as sensed by said level sensor, said station monitoring the temperature of the liquid chemical as indicated by said temperature sensor, and said station monitoring operation of said heater as indicated by said temperature sensor whereby the level of the liquid chemical, the temperature of the liquid chemical and the operation of the heater are monitored by the central station so that operators at the central station can respond to a low level of the liquid chemical or a low temperature of the liquid chemical or a malfunctioning heater in any of the storage and dispensing systems.

19. A system as set forth in claim 18 further comprising a metering device associated with the outfeed line for measuring the amount of liquid chemical dispensed from the tank.

20. A system as set forth in claim 19 wherein the temperature sensor is positioned on said outfeed line inside the enclosure.

21. A system as set forth in claim 18 comprising first and second temperature sensors, the first temperature sensor being positioned on the outfeed line and the second temperature sensor being positioned inside the tank, wherein the communications link transmits signals representative of signals generated by the first and second temperature sensors, and wherein the central station monitors temperature as measured by the first and second temperature sensors.

22. A system as set forth in claim 18 wherein the enclosure has a lower part forming said liquid chemical containment structure, said lower part having a floor and a side wall formation extending up from the floor, and said enclosure having an upper part comprising a roof over the liquid chemical containment structure and side walls extending down from the roof attached to the side wall formation of the liquid chemical containment structure, the upper part having a side wall with said opening therein, said tank having a height substantially greater than the height of said side wall formation of said liquid chemical containment structure, and said enclosure being of sufficient size to permit a person to service the pump and said associated equipment while inside the enclosure at a location adjacent the pump.

23. A system as set forth in claim 18 wherein the enclosure has a lower part forming said liquid chemical containment structure, said lower part having a floor and a side wall formation extending up from the floor, the side wall formation surrounding the tank and being spaced therefrom to create a liquid chemical containment space between the tank and the side wall formation, said containment space being sized to contain a volume of liquid chemical not substantially less than the capacity of the portion of the tank above the side wall formation of the containment structure.

* * * * *